Figure 1:
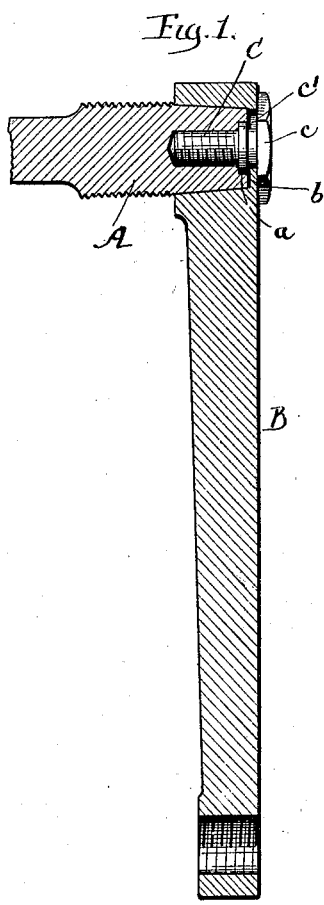

(No Model.)

A. C. FIELD.
MEANS FOR ATTACHING CRANKS TO SHAFTS.

No. 553,400. Patented Jan. 21, 1896.

Witnesses:
Fred Gerlach
Alberta Adamick

Inventor:
A. C. Field
By Prim & Fisher
Attorneys.

UNITED STATES PATENT OFFICE.

ARTHUR C. FIELD, OF CHICAGO, ILLINOIS.

MEANS FOR ATTACHING CRANKS TO SHAFTS.

SPECIFICATION forming part of Letters Patent No. 553,400, dated January 21, 1896.

Application filed October 7, 1895. Serial No. 564,857. (No model.)

*To all whom it may concern:*

Be it known that I, ARTHUR C. FIELD, a citizen of the United States, residing in the city of Chicago, Cook county, Illinois, have invented certain new and useful Improvements in Means for Attaching Cranks or Like Parts to Shafts or Rods, of which I do declare the following to be a full, clear, and exact description, reference being had to the accompanying drawings, forming a part of this specification.

My present invention, while applicable for use in a variety of analogous situations, is more especially designed to provide a means whereby cranks, eccentrics, wheels or the like, that are attached to the ends of shafts, can be readily withdrawn therefrom when desired.

In the accompanying drawings I have shown my invention as applied as an attachment to a crank on the end of a shaft, although it is obvious that the invention can be employed in a variety of situations where it is desirable to provide means whereby the easy withdrawal from the end of a shaft, rod, spindle or the like, of a part attached thereto can be effected. I do not wish, therefore, that the invention shall be understood as restricted to this use, nor do I wish it understood as restricted to the precise details of construction, since these may be varied within wide limits without departing from the scope of the invention.

For the purpose of conciseness in the claims at the end of the specification I employ the words "shaft" and "crank" as designating the parts united together by the screw. I wish it distinctly understood, however, that these words are not used as terms of limitation, but that the word "shaft" is to be understood as synonymous with or including a rod, spindle or the like, and that the word "crank" is to be understood as synonymous with and including an eccentric, wheel or like part.

Heretofore it has been a common practice in attaching cranks to the ends of shafts to taper the end of the shaft and correspondingly taper the crank socket so that the parts might be more securely held together; and in order to better guard against the accidental slipping of the cranks from the shafts it has been customary to pass a screw into a threaded hole in the end of the shaft, the head of the screw being broad enough to bear upon the socket of the crank. A difficulty experienced, however, with this means of attaching cranks to shafts is that if the crank is very securely driven onto the end of the shaft it is difficult and oftentimes impossible to withdraw it therefrom after the guard-screw has been removed without the aid of a "crank-puller" or like device. In certain classes of machines—such, for example, as bicycles—the parts are so assembled that it is often difficult to use a crank-puller or to loosen the crank from the shaft without danger of injuring or marring the parts.

By my present invention I have provided a means whereby a crank or like part may be readily loosened or withdrawn from the end of its shaft without the necessity of using a crank-puller or without danger of injury to the parts.

The invention is hereinafter described, illustrated in the accompanying drawings, and particularly pointed out in the claims at the end of this specification.

Figure 2:
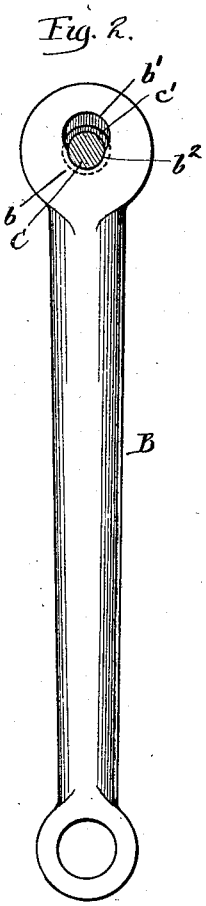
Figure 3:
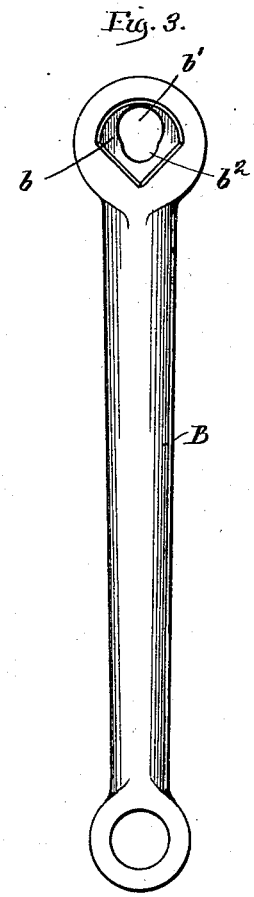
Figure 4:
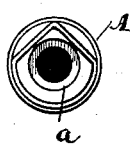
Figure 5:
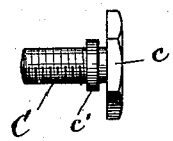

Figure 1 is a view in central vertical section through a portion of a shaft and through a crank attached thereto, my invention being shown as applied to these parts. Fig. 2 is a view in front elevation of the parts shown in Fig. 1, but with the head of the screw removed. Fig. 3 is a detail view in elevation of the inner side of the crank. Fig. 4 is an end view of the shaft. Fig. 5 is a detail view of the screw.

A designates the shaft, and B the crank attached thereto. The end of the shaft A is tapered to fit a correspondingly-tapered socket at the end of the crank, and the end of the shaft and crank-socket are formed with flat faces to securely retain the crank against rotation. The outer end of the crank-socket is shown as partially closed by a plate or flange $b$, in which is formed an opening $b'$, having a reduced offset $b^2$. The end of the shaft A is threaded to receive a screw C, as shown in Fig. 1.

The screw C is preferably formed with a broad head $c$, and beneath this head and at a slight distance therefrom is formed a flange or offset $c'$. Preferably the end of the shaft C will be formed with a seat $a$ to receive the flange $c'$ of the screw. The hole $b'$ in the flange $b$ is of sufficient size to admit the flange or offset $c'$ of the screw C, but the reduced or offset part $b^2$ is of smaller diameter than the flange $b$, and when the parts are in the position seen in Fig. 1 the flange $b$ extends between the flange or offset $c'$ and the head $c$ of the screw C.

From the foregoing description it will be seen that when the crank is to be attached to the shaft the screw C will be passed through the hole $b'$ at the end of the crank-socket and will then be moved laterally until the unthreaded part of the screw is within the reduced portion $b^2$. The screw C will then be turned so as to cause it to enter the threaded hole in the end of the shaft A, and as the screw is thus advanced the crank B will be moved to proper position upon the end of the shaft. When it is desired to withdraw the crank from the shaft it is only necessary to reversely turn the screw C, and as the screw is thus turned backward the flange $c'$, engaging as it does with the plate $b$, will cause the crank C to move outward as the screw is thus withdrawn. By this means, therefore, the power exerted to withdraw the screw is applied also for removing the crank from the end of the shaft. In other words, the screw itself serves as a crank-puller. It will be seen, also, that incidentally the flange or plate $b$, extending as it does partially over the flange $c'$, serves to lock the screw in place and avoid all danger of its accidentally working loose.

While in the preferred form of the invention illustrated the screw C is provided with a broad head, so as to aid in retaining the crank upon the shaft, it is manifest that without departing from the invention the broad head of the screw might be omitted, the projecting stem of the screw beneath such head being merely provided with a notch or groove to receive a screw-driver. In such case the outer end of the crank-socket might be completely closed, except for the opening through which the outer end or head of the screw would extend. In this form of the invention the screw C would not serve to hold the crank to the shaft, but a supplemental screw passing through the end of the crank and engaging with the shaft would be used for this purpose. In this form of the invention, however, as in that previously described, the screw C would serve as it was withdrawn to force the crank from the shaft.

It is obvious that other means may be employed for uniting the screw with the crank or like part in such manner as to cause the reverse or backward movement of the screw to force outward such crank or part; but I have not deemed it necessary to illustrate any of the other ways in which the invention may be practiced, since I regard that shown as the preferable one.

Having thus described the invention, what I claim as new, and desire to secure by Letters Patent, is—

1. The combination of a shaft, a crank and a screw, said crank being provided with a part adapted to be engaged by the screw as the latter is withdrawn, in order to force the crank from the shaft.

2. The combination with a shaft, of a crank having a socket provided at its outer end with an inwardly projecting part, and a screw having a part engaging with the inner face of said projecting part of the crank socket whereby as the screw is withdrawn the crank will be forced from the shaft.

3. The combination with a shaft, of a crank having a socket provided at its outer end with an inwardly projecting part, and a screw having a part engaging with the inner face of said projecting part of the crank socket.

4. The combination with a shaft, of a crank having a socket provided at its outer end with a projecting part and a screw having a part engaging with the inner face of said projecting part and having a head engaging with the outer face of said projecting part of the crank socket.

5. The combination with a shaft, of a crank having a socket partially closed at its outer end but provided with sufficient space or opening in said end to admit a screw and a screw having a broad head and having an off-set flange at a slight distance from said broad head, said flange being arranged to engage the inner face of the partially closed end of the crank socket.

ARTHUR C. FIELD.

Witnesses:
GEO. P. FISHER, Jr.,
FRED GERLACH.